(12) United States Patent
Won et al.

(10) Patent No.: US 11,411,213 B2
(45) Date of Patent: Aug. 9, 2022

(54) NEGATIVE ACTIVE MATERIAL FOR RECHARGEABLE LITHIUM BATTERY, AND RECHARGEABLE LITHIUM BATTERY INCLUDING SAME

(71) Applicant: SAMSUNG SDI CO., LTD., Yongin-si (KR)

(72) Inventors: Jung-Yeon Won, Yongin-si (KR); Kyeu-Yoon Sheem, Yongin-si (KR); Dae-Seop Lim, Yongin-si (KR); Sung-Hwa Eo, Yongin-si (KR); Jung-Wook Cha, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 214 days.

(21) Appl. No.: 14/690,830

(22) Filed: Apr. 20, 2015

(65) Prior Publication Data
US 2015/0349335 A1   Dec. 3, 2015

(30) Foreign Application Priority Data
Jun. 2, 2014   (KR) .................. 10-2014-0067246

(51) Int. Cl.
*H01M 4/36* (2006.01)
*H01M 4/583* (2010.01)
(Continued)

(52) U.S. Cl.
CPC ............. *H01M 4/366* (2013.01); *C01B 32/05* (2017.08); *H01M 4/0471* (2013.01); (Continued)

(58) Field of Classification Search
CPC .... H01M 4/366; H01M 4/0471; H01M 4/583; H01M 4/587; H01M 10/052;
(Continued)

(56) References Cited

U.S. PATENT DOCUMENTS 6,482,547 B1 * 11/2002 Yoon .................. H01M 4/133
429/218.1
7,799,460 B2   9/2010 Choi et al.
(Continued)

FOREIGN PATENT DOCUMENTS

CN        1237003 A     12/1999
CN      102751479 A     10/2012
(Continued)

OTHER PUBLICATIONS

Dresselhaus, M. S., et al. "Defect characterization in graphene and carbon nanotubes using Raman spectroscopy." Philosophical Transactions of the Royal Society of London A: Mathematical, Physical and Engineering Sciences 368.1932 (2010): 5355-5377.*
(Continued)

*Primary Examiner* — Stewart A Fraser
*Assistant Examiner* — Claire L Roe
(74) *Attorney, Agent, or Firm* — Lee IP Law, P.C.

(57) ABSTRACT

A negative active material for a rechargeable lithium battery includes a composite carbon particle including a core particle including crystalline-based carbon and a coating layer positioned on the surface of the core particle and including amorphous carbon. A peak intensity ($I_{1620}$) at 1620 cm$^{-1}$ ranges from about 0.01 to about 0.1, a peak intensity ($I_{1360}$) at 1360 cm$^{-1}$ ranges from about 0.05 to about 0.5, and a peak intensity ($I_{1580}$ at 1580 cm$^{-1}$ ranges from about 0.1 to about 0.8 in a Raman spectrum of the composite carbon particle.

9 Claims, 7 Drawing Sheets

(51) Int. Cl.
| | |
|---|---|
| *H01M 10/052* | (2010.01) |
| *H01M 4/04* | (2006.01) |
| *H01M 4/587* | (2010.01) |
| *C01B 32/05* | (2017.01) |
| *H01M 4/02* | (2006.01) |
| *H01M 4/133* | (2010.01) |

(52) U.S. Cl.
CPC .......... *H01M 4/583* (2013.01); *H01M 4/587* (2013.01); *H01M 10/052* (2013.01); *C01P 2002/82* (2013.01); *H01M 4/133* (2013.01); *H01M 2004/021* (2013.01); *H01M 2004/027* (2013.01)

(58) Field of Classification Search
CPC . H01M 4/133; H01M 2004/021; C01B 31/02; C01P 2002/82; Y02E 60/122
See application file for complete search history.

(56) References Cited

U.S. PATENT DOCUMENTS

| | | |
|---|---|---|
| 2002/0015888 A1 | 2/2002 | Omaru et al. |
| 2005/0058904 A1 | 3/2005 | Kano et al. |
| 2012/0270108 A1* | 10/2012 | Shin .................. B82Y 30/00 429/226 |
| 2014/0308585 A1* | 10/2014 | Han .................. H01M 4/362 429/231.8 |

FOREIGN PATENT DOCUMENTS

| | | |
|---|---|---|
| JP | 11-354122 | 12/1999 |
| JP | 2001-273894 | 5/2001 |
| JP | 2001-332263 | 11/2001 |
| JP | 2003-208896 | 7/2003 |
| JP | 2005-5113 | 1/2005 |
| JP | 2005-71679 | 3/2005 |
| JP | 2009-4304 | 1/2009 |
| JP | 2009-123474 A | 6/2009 |
| JP | 2009-211818 | 9/2009 |
| JP | 2013-98089 | 5/2013 |
| KR | 1999-018715 | 3/1999 |
| KR | 10-2000-0019114 | 4/2000 |
| KR | 10-2000-0032795 A | 6/2000 |
| KR | 10-2001-0054903 A | 7/2001 |
| KR | 10-2002-0010843 A | 2/2002 |
| KR | 10-2004-0057417 A | 7/2004 |
| KR | 10-2005-0099697 A | 10/2005 |

OTHER PUBLICATIONS

Lambert, Timothy N., et al. "Graphite oxide as a precursor for the synthesis of disordered graphenes using the aerosol-through-plasma method." Carbon 48.14 (2010): 4081-4089.*
Ryu, Sunmin, et al. "Raman spectroscopy of lithographically patterned graphene nanoribbons." ACS nano 5.5 (2011): 4123-4130.*
Jorio A, Dresselhaus M S, Saito R and Dresselhaus G 2011 Raman Spectroscopy in Graphene Related System 1st edn (Weinheim: Wiley).*
Childres, Isaac, et al. "Raman spectroscopy of graphene and related materials." New developments in photon and materials research 1 (2013).*
Axel Eckmann, Probing the Nature of Defects in Graphene by Raman Spectroscopy, Nano Letters 2012, 12, 3925-3930.
Wang, et al., "Raman Spectroscopy of Carbon Materials: Structural Basis of Observed Spectra", Chemistry of Materials, Sep. 1, 1990, pp. 557-563.
Tsumura, et al., "Surface Modification of Natural Graphite Particles for Lithium Ion Batteries" Solid State Ionics, North Holland Pub. Company. vol. 135, Issues 1-4, Nov. 1, 2000, pp. 209-212.
Extended European Search Report dated Oct. 13, 2015 in Corresponding European Patent Application No. 15169970.9.
European Search Report dated Apr. 19, 2018.
Haipeng Zhao et al. Purification and Carbon Film Coating of Natural Graphite as Anode Materials for Li-Ion Batteries, Electrochimica Acta. 52. 2007, pp. 6006-6011.
Chinese Office Action dated Jan. 30, 2019.
Japanese Office Action dated Mar. 26, 2019.
M.A. Pimenta, et al. "Studying Disorder in Graphite-based Systems by Raman Spectroscopy", Phys. Chem. Chem. Phys. 2007, 9, 1276-1291.
Jagjit Nanda, et al. In situ Raman Microscopy during Discharge of a High Capacity, etc . . . , Electrochemistry Communications, 11, 2009, 235-237.
Moni Kanchan Datta et al. "Silicon and Carbon Based Composite Anodes for Lithium Ion Batteries", Journal of Power Sources, 158, 2006, 557-563.
European Office Action dated Sep. 24, 2019.
European Office action dated Nov. 20, 2020.
Chinese Office Action dated Jun. 3, 2020, of the corresponding Chinese Patent Application No. 201510295554.3
European Office Action dated Jun. 22, 2020, of the corresponding European Patent Application No. 15169970.9.
Korean Office Action dated May 4, 2020.

* cited by examiner

NEGATIVE ACTIVE MATERIAL FOR RECHARGEABLE LITHIUM BATTERY, AND RECHARGEABLE LITHIUM BATTERY INCLUDING SAME

CROSS-REFERENCE TO RELATED APPLICATION

Korean Patent Application No. 10-2014-0067246 filed on Jun. 2, 2014, in the Korean Intellectual Property Office, and entitled: "Negative Active Material for Rechargeable Lithium Battery, and Rechargeable Lithium Battery Including Same," is incorporated by reference herein in its entirety.

BACKGROUND

1. Field

Embodiments are directed to negative active material for a rechargeable lithium battery and a rechargeable lithium battery including the same.

2. Description of the Related Art

Recently, a rechargeable lithium battery has been widely applied as a power source for electric vehicles, electric power storage apparatuses, or the like, as well as for a small portable electronic device. For the various uses, a customized electrode active material is desirable.

SUMMARY

Embodiments are directed to a negative active material for a rechargeable lithium battery that includes a composite carbon particle including a core particle including crystalline-based carbon; and a coating layer positioned on the surface of the core particle and including amorphous carbon, wherein a peak intensity ($I_{1620}$) at 1620 cm$^{-1}$ ranges from about 0.01 to about 0.1, a peak intensity ($I_{1360}$) at 1360 cm$^{-1}$ ranges from about 0.05 to about 0.5, and a peak intensity ($I_{1580}$) at 1580 cm$^{-1}$ ranges from about 0.1 to about 0.8 in the Raman spectrum of the composite carbon particle.

A ratio ($I_{1360}/I_{1620}$) of the peak intensity ($I_{1360}$) at 1360 cm$^{-1}$ to the peak intensity ($I_{1620}$) at 1620 cm$^{-1}$ may range from about 2 to about 20 in the Raman spectrum of the composite carbon particle.

The ratio ($I_{1360}/I_{1620}$) of the peak intensity ($I_{1360}$) at 1360 cm$^{-1}$ to the peak intensity ($I_{1620}$) at 1620 cm$^{-1}$ may range from about 3 to about 13 in the Raman spectrum of the composite carbon particle.

The ratio ($I_{1360}/I_{1620}$) of the peak intensity ($I_{1360}$) at 1360 cm$^{-1}$ to the peak intensity ($I_{1620}$) at 1620 cm$^{-1}$ may range from about 3 to about 6 in a Raman spectrum of the composite carbon particle.

The ratio of ($I_{1620}/I_{1580}$) of the peak intensity ($I_{1620}$) at 1620 cm$^{-1}$ to the peak intensity ($I_{1580}$) at 1580 cm$^{-1}$ may range from about 0.01 to about 0.5 in a Raman spectrum of the composite carbon particle.

The ratio of ($I_{1620}/I_{1580}$) of the peak intensity ($I_{1620}$) at 1620 cm$^{-1}$ to the peak intensity ($I_{1580}$) at 1580 cm$^{-1}$ may have a substantially constant value in a Raman spectrum of the composite carbon particle regardless of the content of the amorphous carbon.

The amorphous carbon may be included in an amount of about 0.1 wt % to about 50 wt % based on the total weight of the composite carbon particle.

The amorphous carbon may be included in an amount of about 5 wt % to about 30 wt % based on the total weight of the composite carbon particle.

The average particle diameter (D50) of the core particle may be about 3 μm to about 50 μm.

The thickness of the coating layer may be about 0.001 μm to about 30 μm.

The crystalline-based carbon may include natural graphite, artificial graphite, or a combination thereof.

The amorphous carbon may include soft carbon, hard carbon, or a combination thereof.

The soft carbon may be obtained from coal pitch, petroleum pitch, polyvinylchloride, mesophase pitch, tar, low molecular weight heavy oil, or a combination thereof, and the hard carbon may be obtained from a polyvinyl alcohol resin, a furfuryl alcohol resin, triton, citric acid, stearic acid, sucrose, polyvinylidene fluoride, carboxymethyl cellulose, hydroxypropyl cellulose, regenerated cellulose, polyvinylpyrrolidone, polyethylene, polypropylene, an ethylene-propylene-diene monomer (EPDM), polyacrylic acid, sodium polyacrylate, polyacrylonitrile, glucose, gelatin, a saccharide, a phenolic resin, a naphthalene resin, a polyamide resin, a furan resin, a polyimide resin, a cellulose resin, a styrene resin, an epoxy resin, a vinyl chloride resin, or a combination thereof.

Embodiments are also directed to a negative electrode including the negative active material for a rechargeable lithium battery Embodiments are also directed to a rechargeable lithium battery including the negative electrode, a positive electrode, and an electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
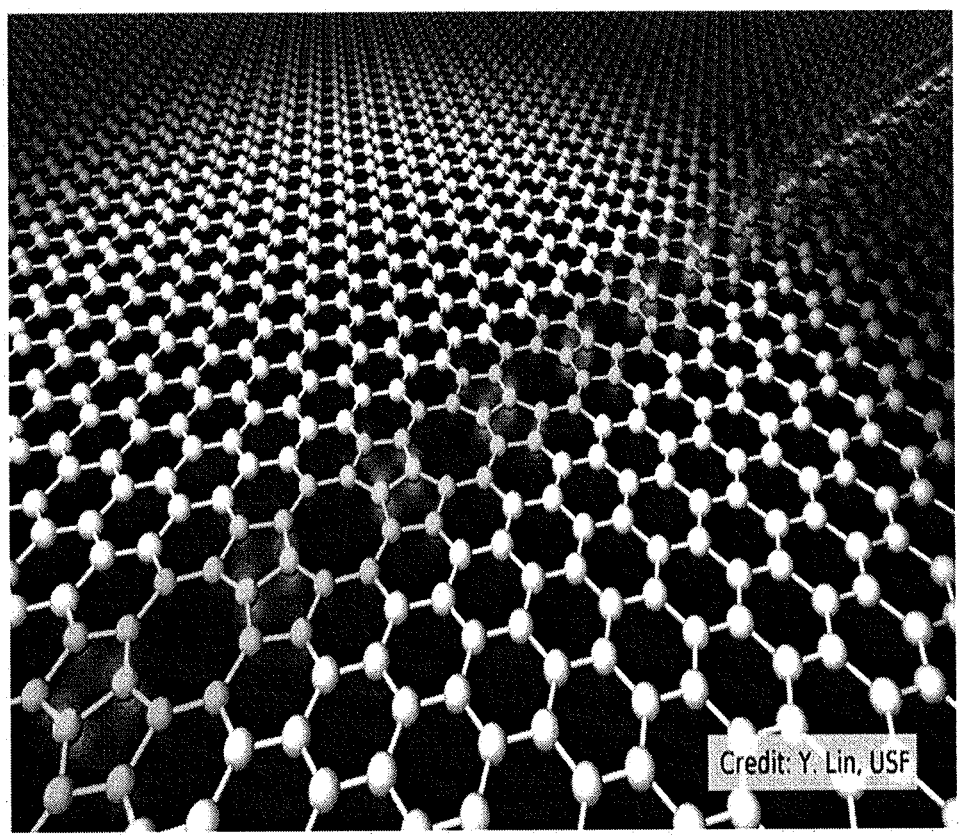
FIG. 1 is a drawing illustrating the concept of a boundary-shaped defect formed on the interface between crystalline-based carbon and amorphous carbon.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration.

A negative active material for a rechargeable lithium battery according to one embodiment includes a composite carbon particle including a core particle including crystalline-based carbon and a coating layer positioned on the surface of the core particle and including amorphous carbon.

When the Raman spectrum of the composite carbon particle is measured, the peak intensity ($I_{1620}$) at 1620 cm$^{-1}$ is in a range of 0.010 to 0.1, the peak intensity ($I_{1360}$) at 1360 cm$^{-1}$ is in a range of 0.05 to 0.5, and the peak intensity ($I_{1580}$) at 1580 cm$^{-1}$ is in a range of 0.1 to 0.8. The peak intensity ($I_{1360}$) at 1360 cm$^{-1}$, the peak intensity ($I_{1580}$) at 1580 cm$^{-1}$, and the peak intensity ($I_{1620}$) at 1620 cm$^{-1}$ may be respectively represented as $I_D$, $I_G$ and $I_D'$.

A composite carbon particle having the $I_D$, $I_G$ and $I_D'$ values within the ranges may have relatively small interface resistance. This result may indicate a satisfactory amalgamation state between the core particle formed of crystalline carbon and the coating layer formed of amorphous carbon. Herein, the $I_D$, $I_G$ and $I_D'$ values may just satisfy the range, but combinations thereof have no particular limit.

A ratio of the peak intensity ($I_{1360}$) at 1360 cm$^{-1}$ to the peak intensity ($I_{1620}$) at 1620 cm$^{-1}$ ($I_{1360}/I_{1620}$, that is, $I_D/I_D'$) in the Raman spectrum of the composite carbon particle may be, for example, 2 to 20, 3 to 13, 3 to 6, or 3 to 5.

When the $I_D/I_D'$ is within the range, boundary-shaped defects may be more prevalent than vacancy-shaped defects on the interface between the crystalline-based carbon core and the amorphous-based coating layer.

Figure 2:
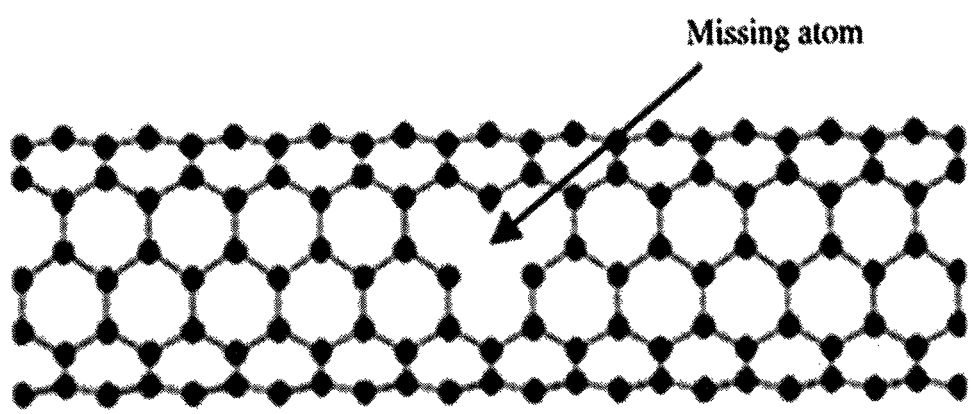
FIGS. 2 and 3 are drawings illustrating the concept of a vacancy-shaped defect on the interface between crystalline-based carbon and amorphous carbon.
Figure 3:
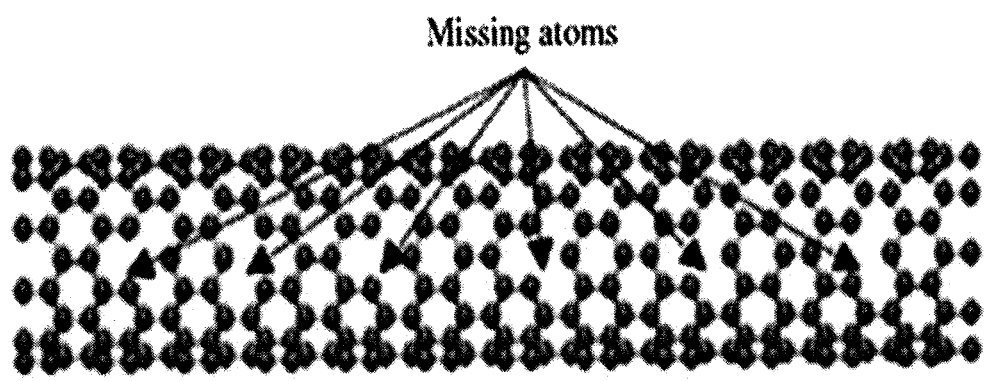

In general, a defect on the interface of a composite particle may be classified into a boundary-shaped defect and a vacancy-shaped defect, wherein the boundary-shaped defect indicates a linearly-dislocated defect, while the vacancy-shaped defect indicates a defect positioned like a dot. FIG. 1 is a drawing illustrating a boundary-shaped defect, and FIGS. 2 and 3 are drawings illustrating vacancy-shaped defects. Referring to FIGS. 1 to 3, the vacancy-shaped defect may be generated by missing atoms unlike the boundary-shaped defect.

In addition, the boundary-shaped defect may have relatively more defect sites than the vacancy-shaped defect and thus, may secure more paths for lithium intercalation.

According to one embodiment, the composite carbon particle may have a dualistic structure including a crystalline-based carbon as a core particle and amorphous carbon on the surface of the core particle. Excellent amalgamation between the crystalline-based carbon and amorphous carbon may be accomplished, and lithium ions may be substantially transported as if there were no interface between the core and the coating layer. The composite carbon particle may exhibit characteristics similar to those of so-called pseudo-crystallized carbon.

The amorphous carbon may be included in an amount of about 0.1 wt % to about 50 wt % based on the total weight or amount of the composite carbon particle. Within the range, the amorphous carbon may be, for example, included in an amount of about 1 wt % to 30 wt %, 5 wt % to 30 wt %, or 5 wt % to 25 wt %. When the amorphous carbon is included within the range, high power characteristics of a rechargeable lithium battery may be secured.

The Raman peak of the composite carbon particle according to one embodiment is illustrated again.

A ratio of ($I_{1620}/I_{1580}$, that is to say, $I_D'/I_G$) of the peak intensity ($I_{1620}$) at 1620 cm$^{-1}$ relative to the peak intensity ($I_{1580}$) at 1580 cm$^{-1}$ may be, for example about 0.01 to 0.5, 0.01 to 0.2, or 0.05 to 0.13 in a Raman spectrum of the composite carbon particle. A ratio ($I_{1620}/I_{1580}$), that is to say, $I_D'/I_G$) of the peak intensity ($I_{1620}$) at 1620 cm$^{-1}$ relative to the peak intensity ($I_{1580}$) at 1580 cm$^{-1}$ in a Raman spectrum of the composite carbon particle may have a substantially constant value regardless of the content of the amorphous carbon particle. Herein, the substantially constant value may be within an error range of ±0.025.

The constant $I_D'/I_G$ value regardless of the content of the amorphous carbon particle may be obtained by a small structural defect on the interface between the crystalline-based carbon core and the amorphous carbon coating layer.

The average particle diameter (D50) of the core particle may be, for example about 3 μm to about 50 μm. The term "average particle diameter (D50)" indicates a particle diameter corresponding to 50 volume % of a cumulative volume in a particle distribution.

The thickness of the coating layer may be about 0.001 μm to about 30 μm, for example about 0.01 μm to about 20 μm, or about 0.1 μm to about 15 μm. When the thickness of the coating layer is within the range, initial efficiency characteristics, high-rate charge and discharge characteristics and cycle-life characteristics may be improved.

The average particle diameter (D50) of the composite carbon particle may be, for example about 7 μm to about 80 μm.

The crystalline-based carbon included in the core particle may include, for example, natural graphite, artificial graphite or a combination thereof. The amorphous carbon included in the coating layer may include, for example, soft carbon, hard carbon, or a combination thereof.

For example, the soft carbon may be obtained from coal pitch, petroleum pitch, polyvinylchloride, mesophase pitch, tar, low molecular weight heavy oil, or a combination thereof. The hard carbon may be obtained from a polyvinyl alcohol resin, a furfuryl alcohol resin, triton, citric acid, stearic acid, sucrose, polyvinylidene fluoride, carboxylmethyl cellulose, hydroxypropyl cellulose, regenerated cellulose, polyvinylpyrrolidone, polyethylene, polypropylene, an ethylene-propylene-diene monomer (EPDM), polyacrylic acid, sodium polyacrylate, polyacrylonitrile, glucose, gelatin, a saccharide, a phenolic resin, a naphthalene resin, a polyamide resin, a furan resin, a polyimide resin, cellulose resin, a styrene resin, an epoxy resin and vinyl chloride resin, or a combination thereof, as examples.

Hereinafter, a rechargeable lithium battery including the negative active material according to another embodiment is provided. The rechargeable lithium battery is illustrated referring to FIG. 4, which shows one example of the rechargeable lithium battery. The rechargeable battery may have any suitable shape such as a prismatic shape, a coin-type shape, a pouch shape, or the like, as well as a cylinder shape.

Figure 4:
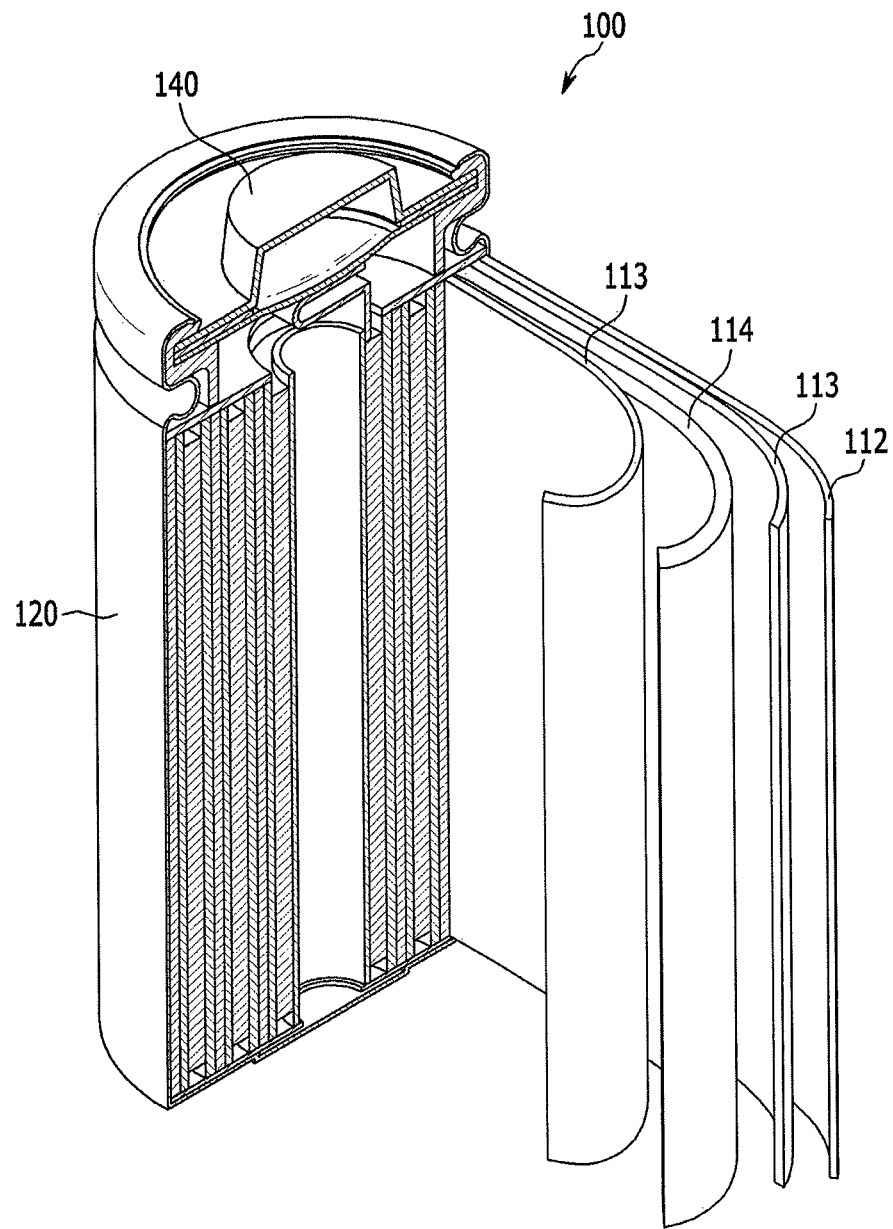
FIG. 4 illustrates a schematic view showing a rechargeable lithium battery according to one embodiment.

FIG. 4 is a schematic view showing a rechargeable lithium battery according to one embodiment.

Referring to FIG. 4, a rechargeable lithium battery 100 according to one embodiment may an electrode assembly including a positive electrode 114, a negative electrode 112 facing the positive electrode 114, a separator 113 interposed between the negative electrode 112 and the positive electrode 114, an electrolyte (not shown) impregnating the separator 113, a battery case 120, and a sealing member 140 sealing the battery case 120. The electrode assembly may be impregnated in an electrolyte.

The negative electrode 112 may include a current collector and a negative active material layer formed on the current collector.

The current collector may be a copper foil.

The negative active material layer may include a negative active material, a binder, and optionally, a conductive material.

The negative active material may be the same as described above.

The binder may improve binding properties of negative active material particles with one another and with a current collector.

The binder may be an organic binder. The organic binder may be polyvinylidene fluoride, polyimide, polyamideimide, polyamide, aramid, polyarylate, polyetheretherketone, polyetherimide, polyethersulfone, polysulfone, polyphenylenesulfide, polytetrafluoroethylene, or a combination thereof.

The conductive material may improve conductivity of an electrode. Any suitable electrically conductive material that does not cause a chemical change may be used as the conductive material. Examples thereof include a carbon-based material such as natural graphite, artificial graphite, carbon black, acetylene black, ketjen black, a carbon fiber, or the like; a metal-based material such as a metal powder or a metal fiber, or the like of copper, nickel, aluminum, silver, and the like; a conductive polymer such as a polyphenylene derivative or the like; or a mixture thereof.

The negative active material may be included in an amount of about 90 wt % to 98 wt %, the binder may be included in an amount of about 1 wt % to about 5 wt % and the conductive material may be included in an amount of about 1 wt % to about 5 wt %.

The negative electrode may be manufactured by mixing the negative active material, the conductive material, and the organic binder in water to prepare a negative active material layer composition, and coating the negative active material layer composition onto the current collector.

The positive electrode 114 may include a current collector and a positive active material layer formed on the current collector. The positive active material layer may include a positive active material, a binder, and optionally, a conductive material.

The current collector may include Al (aluminum), for example.

The positive active material may include lithiated intercalation compounds that reversibly intercalate and deintercalate lithium ions.

The positive active material may be a lithium-containing compound of a lithium-containing oxide, a lithium-containing phosphate salt, a lithium-containing silicate, or a combination thereof.

The lithium-containing oxide, the lithium-containing phosphate salt and the lithium-containing silicate may be respectively an oxide, a phosphate salt and a silicate that include lithium and a metal.

Examples of the metal may be Co, Ni, Mn, Fe. Cu, V, Si, Al, Sn, Pb, Sn, Ti, Sr, Mg, Ca, or the like.

Examples of the lithium-containing oxide include lithium cobalt oxide, lithium nickel oxide, lithium manganese oxide, lithium nickel cobalt manganese oxide, lithium nickel cobalt aluminum oxide, or the like. Examples of the lithium-containing phosphate salt include a lithium iron phosphate salt, a lithium manganese phosphate, a lithium iron molybdenum phosphate salt, or the like.

The positive active material may include activated carbon other than the lithium-containing compound. When the activated carbon is used together, high output characteristics may be secured by obtaining the same effect as that of a capacitor.

The activated carbon may be a porous carbon material and thus, may have strong ion adsorption due to a large surface area and a fast chemical reaction.

The activated carbon may be included in an amount of about 1 wt % to about 40 wt %, or, for example, about 1 wt % to about 15 wt %, or, for example, about 3 wt % to about 5 wt % based on the total amount of the lithium-containing compound and the activated carbon. When the activated carbon is used within the range, high energy density and high power characteristics may be simultaneously secured.

The binder may improve binding properties of positive active material particles with one another and with a current collector. Specific examples may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material improves conductivity of an electrode. As with the negative electrode, any suitable electrically conductive material that does not cause a chemical change may be used as the conductive material included in the positive electrode. Examples thereof may include one or more of natural graphite, artificial graphite, carbon black, acetylene black, ketjen black, a carbon fiber, a metal powder, a metal fiber, or the like of copper, nickel, aluminum, silver, or the like, or a conductive material such as a polyphenylene derivative or the like.

The positive active material may be included in an amount of about 90 wt % to 98 wt %, the binder may be included in an amount of about 1 wt % to about 5 wt % and the conductive material may be included in an amount of about 1 wt % to about 5 wt %.

The positive electrode may be manufactured by combining an active material, a conductive material, and a binder in a solvent to prepare an active material composition, and coating the composition onto a current collector. The solvent may include N-methylpyrrolidone and the like, but is not limited thereto.

The electrolyte solution may include a non-aqueous organic solvent and a lithium salt.

The non-aqueous organic solvent may serve as a medium for transmitting ions taking part in the electrochemical reaction of a battery. The non-aqueous organic solvent may be selected from a carbonate-based, ester-based, ether-based, ketone-based, alcohol-based, and aprotic solvent.

The carbonate based solvent may be, for example, dimethyl carbonate (DMC), diethyl carbonate (DEC), dipropyl carbonate (DPC), methyipropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like.

When linear carbonate compounds and cyclic carbonate compounds are mixed, an organic solvent having a high dielectric constant and a low viscosity may be provided. The cyclic carbonate and the linear carbonate may be mixed together in a volume ratio ranging from about 1:1 to 1:9.

In addition, the ester-based solvent may be, for example, methylacetate, ethylacetate, n-propylacetate, dimethylacetate, methylpropionate, ethylpropionate, γ-butyrolactone, decanolide, valerolactone, mevalonolactone, caprolactone, or the like. The ether solvent may be, for example dibutylether, tetraglyme, diglyme, dimethoxyethane, 2-methyltetrahydrofuran, tetrahydrofuran, or the like, and the ketone-based solvent may be cyclohexanone, or the like. The alcohol-based solvent may be ethanol, isopropyl alcohol, or the like.

The non-aqueous organic solvent may be used singularly or in a mixture, and when the organic solvent is used in a mixture, the mixture ratio may be controlled in accordance with a desirable battery performance.

The non-aqueous electrolyte may further include an overcharge inhibitor additive such as ethylene carbonate, pyrocarbonate, or the like.

The lithium salt may be dissolved in an organic solvent, may supply lithium ions in a battery, may basically operate the rechargeable lithium battery, and may improve lithium ion transportation between positive and negative electrodes therein.

Specific examples of the lithium salt include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, e.g. an integer of 1 to 20, LiCl, LiI, $LiB(C_2O_4)_2$(lithium bis(oxalato) borate, LiBOB), or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator 113 separates the negative electrode 112 from the positive electrode 114 and provides a transporting passage for lithium ion. The separator 113 may include any suitable material for use in a lithium battery. The separator may have a low resistance to ion transportation and an excellent impregnation for an electrolyte. For example, the separator 113 may be selected from glass fiber, polyester, polyethylene, polypropylene, polytetrafluoroethylene (PTFE), or a combination thereof. The separator 113 may have a form of a non-woven fabric or a woven fabric. For example, a polyolefin-based polymer separator such as polyethylene, polypropylene or the like may be used. In order to ensure the heat resistance or mechanical strength, a coated separator including a ceramic component or a polymer material may be used. The separator may have a monolayered or multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLE 1

Soft carbon was coated on the core of an artificial graphite component (average particle diameter (D50): 10 μm) by a chemical vapor deposition method to form single coating layer with a thickness of 13 nm. The thickness of the coating layer was mechanically controlled to include the soft carbon in an amount of 5 wt % based on the total weight of the entire carbon particles.

Subsequently, the coated graphite particle was heat-treated at 1,100° C. for 5 hours, obtaining a composite carbon particle.

EXAMPLE 2

A composite carbon particle was obtained according to the same method as Example 1 except for including the soft carbon in an amount of 15 wt % based on the total weight of the entire carbon particles.

EXAMPLE 3

A composite carbon particle was obtained according to the same method as Example 1 except for including the soft carbon in an amount of 25 wt % based on the total weight of the entire carbon particles.

EXAMPLE 4

Graphite as a core was added to a colloid pitch solution in which soft carbon particles were dispersed. A thin coating layer was formed on the core surface of artificial graphite and sulfur components in an atomization method. The sulfur components were derived from sulfur impurities included in the colloid pitch solution.

Subsequently, the obtained graphite particles were heated by increasing a temperature by 2° C./min up to 500° C. under a room temperature nitrogen atmosphere. The resulting graphite particles were maintained at 500° C. for about 3 hours to form the coating layer on the surface of the graphite. Subsequently, a thin film structure was formed by removing nitrogen therefrom and injecting air in a small amount thereinto.

The thickness of the coating layer was adjusted to include the soft carbon in an amount of 5 wt % based on the total weight of the entire carbon particles.

EXAMPLE 5

A composite carbon particle was obtained according to the same method as Example 4 except for including the content of the soft carbon in an amount of 15 wt % based on the total weight of the entire carbon particle.

EXAMPLE 6

A composite carbon particle was obtained according to the same method as Example 4 except for including the soft carbon in an amount of 25 wt % based on the total weight of the entire carbon particle.

COMPARATIVE EXAMPLE 1

A graphite particle available from Aldrich was used.

Scanning Electron Microscope (SEM) Photograph Analysis

Figure 5:
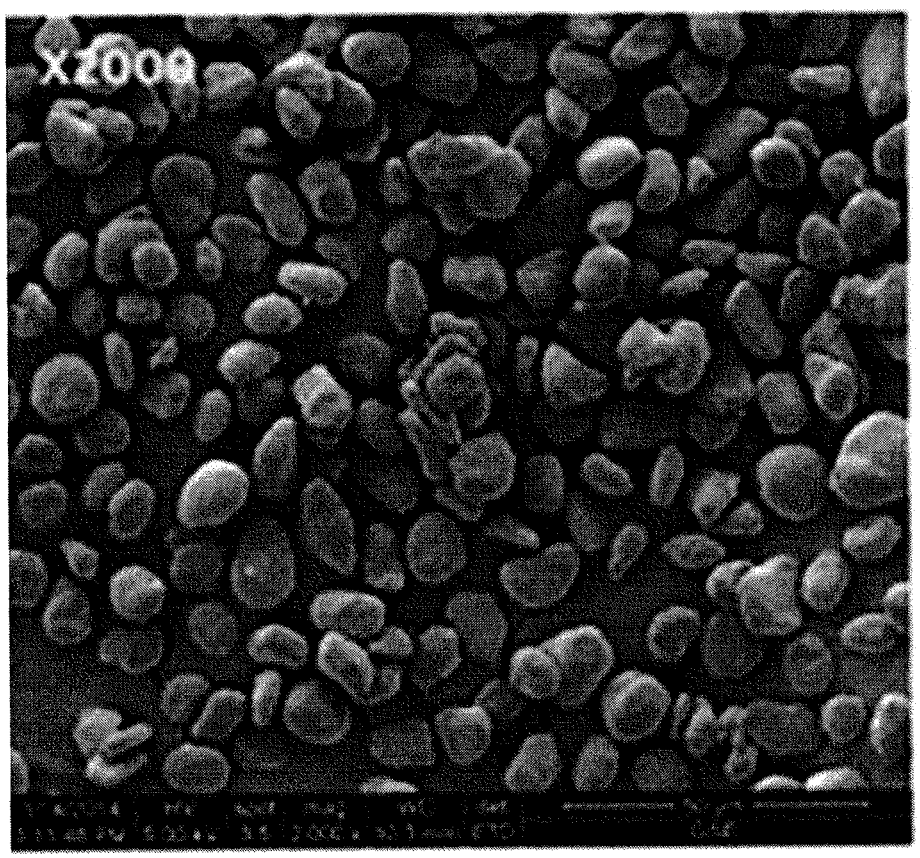
FIGS. 5 and 6 illustrate drawings respectively showing 2,000× and 5,000× SEM images of the composite carbon particle of Example 1.
Figure 6:
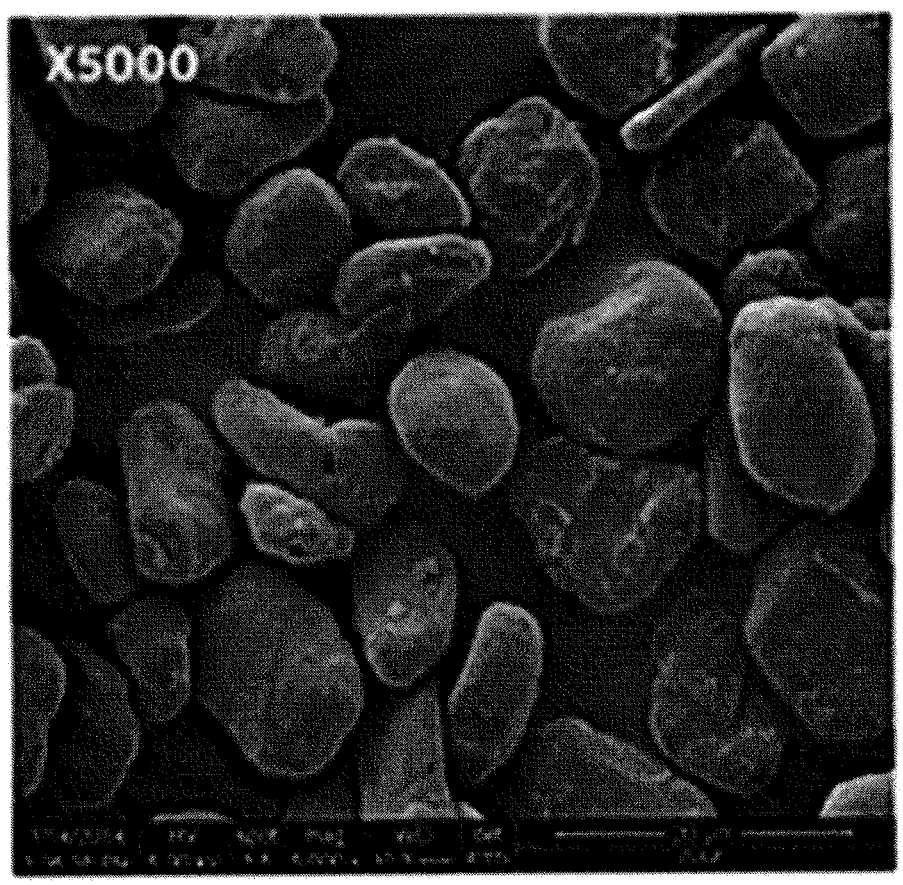

The composite carbon particle of Example 1 was examined by using SEM. FIGS. 5 and 6 respectively show 2,000× and 5,000× SEM images of the composite carbon particle according to Example 1. Referring to FIGS. 5 and 6, the composite carbon particle of Example 1 had an average particle diameter (D50) of about 10 to 13 μm.

X-Ray Diffraction Analysis (XRD)

Figure 7:
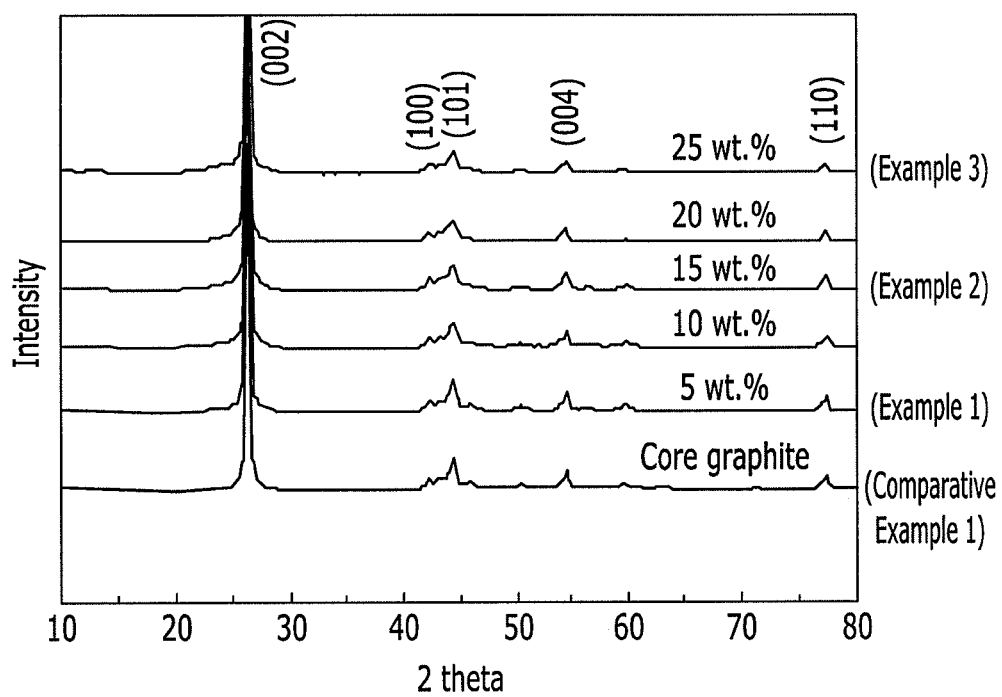
FIG. 7 illustrates a graph showing XRD analysis results of the composite carbon particles according to Examples 1 to 3 and graphite particle according to Comparative Example 1.

The XRD analysis results of the composite carbon particles of Examples 1 to 3 and the graphite particle of Comparative Example 1 (as well as composite carbon particles formed according the Example 1 and including soft carbon in the amounts of 10% and 20%) are provided in FIG. 7. Referring to FIG. 7, the result of Comparative Example 1 showed a 002 peak, which is a main peak of graphite, and as the coating amount of the soft carbon increased, a 101 peak became wider.

Raman Peak Analysis

Raman peak of the composite carbon particles according to Examples 1 to 6 was measured.

The results are provided in Table 1.

TABLE 1

| Peak intensity | | D' band | D band | G band | Ratio of D'/G band | Ratio of D/G band | Ratio of D/D' band |
|---|---|---|---|---|---|---|---|
| Example 1 | S.C. 5 wt. % coating | 0.031 | 0.098 | 0.235 | 0.131 | 0.417 | 3.2 |
| Example 2 | S.C. 15 wt. % coating | 0.025 | 0.105 | 0.184 | 0.134 | 0.571 | 4.2 |
| Example 3 | S.C. 25 wt. % coating | 0.053 | 0.244 | 0.409 | 0.129 | 0.597 | 4.6 |
| Example 4 | S.C. 5 wt. % coating | 0.035 | 0.100 | 0.232 | 0.151 | 0.431 | 2.9 |
| Example 5 | S.C. 15 wt. % coating | 0.022 | 0.104 | 0.180 | 0.122 | 0.578 | 4.7 |
| Example 6 | S.C. 25 wt. % coating | 0.052 | 0.240 | 0.407 | 0.128 | 0.590 | 4.6 |

In the above Table 1, peak intensity at D', D and G bands respectively indicates peak intensity ($I_{1620}$) at 1620 cm$^{-1}$ peak intensity ($I_{1360}$) at 1360 cm$^{-1}$ and peak intensity ($I_{1580}$) at 1580 cm$^{-1}$.

Referring to Table 1, as the coating amount of the soft carbon was increased in Examples 1 to 6, peak intensity at the D band increased, and the D/G peak intensity increased along therewith.

On the other hand, the D'/G peak intensity was about 0.13 to about 0.15 regardless of the coating amount of the soft carbon. Without being bound to any particular theory, it is believed that the reason the D'/G peak intensity was about 0.13 regardless of the coating amount of the soft carbon in the composite carbon particles of Examples 1 to 6 was that the peak intensity at the D' band indicates that a structural defect on the surface of a core was constantly maintained regardless of the coating amount, indicating that the core and the coating layer were highly fused.

By way of summation and review, for a negative active material for a rechargeable lithium battery, a carbon-based material has been mainly used. Carbon-based materials are generally classified into crystalline-based graphite and amorphous carbon. The crystalline-based graphite is generally used as a power source for a small portable electronic device, and the amorphous carbon is generally used as a negative active material for a rechargeable lithium battery as a power source for a hybrid vehicle (HEV) requiring high power characteristics.

Recently, attempts to develop a composite negative active material to simultaneously secure capacity and output characteristics by mixing the crystalline-based graphite and the amorphous carbon have been made. However, the desired effect has not been achieved due to issues of interface resistance of the crystalline-based graphite and the amorphous carbon or the like.

Embodiments provide a negative active material for a rechargeable lithium battery having high power characteristics by improving an interface amalgamation degree between a crystalline-based carbon core and an amorphous carbon coating layer, i.e., reducing an interface resistance, and thus, decreasing transport resistance of lithium ions. In the composite carbon particle for a negative active material including a core particle of a crystalline-based carbon component and a coating layer of an amorphous carbon component according to embodiments, high power characteristics of a rechargeable lithium battery may be secured by achieving a high amalgamation degree on the interface between the core particle and the coating layer such that lithium may be smoothly intercalated and deintercalated. Another embodiment provides the negative electrode including a negative active material. Another embodiment provides a rechargeable lithium battery including the negative electrode.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A negative active material for a rechargeable lithium battery, the negative active material comprising:
    a composite carbon particle including:
        a core particle including crystalline-based carbon; and
        a coating layer positioned on the surface of the core particle and including amorphous carbon, wherein:
    a peak intensity ($I_{1620}$) at 1620 cm$^{-1}$ ranges from about 0.01 to about 0.1, a peak intensity ($I_{1360}$) at 1360 cm$^{-1}$ ranges from about 0.05 to about 0.5, and a peak intensity ($I_{1580}$) at 1580 cm$^{-1}$ ranges from about 0.1 to about 0.8 in a Raman spectrum of the composite carbon particle, provided that a ratio ($I_{1360}/I_{1620}$) of the peak intensity ($I_{1360}$) at 1360 cm$^{-1}$ to the peak intensity ($I_{1620}$) at 1620 cm$^{-1}$ is from 3.2 to 4.7,
    a ratio ($I_{1620}/I_{1580}$) of the peak intensity ($I_{1620}$) at 1620 cm$^{-1}$ to the peak intensity ($I_{1580}$) at 1580 cm$^{-1}$ in a Raman spectrum of the composite carbon particle is about 0.122 to about 0.151,
    the amorphous carbon is included in an amount of 5 wt % to 25 wt % based on the total weight of the composite carbon particle, and
    the coating layer is a chemical vapor deposition layer or is an atomization layer.

2. The negative active material for a rechargeable lithium battery as claimed in claim 1, wherein the average particle diameter (D50) of the core particle ranges from about 3 μm to about 50 μm.

3. The negative active material for a rechargeable lithium battery as claimed in claim 1, wherein the thickness of the coating layer ranges from about 0.001 μm to about 30 μm.

4. The negative active material for a rechargeable lithium battery as claimed in claim 1, wherein the crystalline-based carbon includes natural graphite, artificial graphite, or a combination thereof.

5. The negative active material for a rechargeable lithium battery as claimed in claim 1, wherein the amorphous carbon includes soft carbon, hard carbon, or a combination thereof.

6. The negative active material for a rechargeable lithium battery as claimed in claim 5, wherein:
    the amorphous carbon includes the combination of soft carbon and hard carbon,
    the soft carbon is obtained from coal pitch, petroleum pitch, polyvinylchloride, mesophase pitch, tar, low molecular weight heavy oil, or a combination thereof, and
    the hard carbon is obtained from a polyvinyl alcohol resin, a furfuryl alcohol resin, triton, citric acid, stearic acid, sucrose, polyvinylidene fluoride, carboxymethyl cellulose, hydroxypropyl cellulose, regenerated cellulose, polyvinylpyrrolidone, polyethylene, polypropylene, an ethylene-propylene-diene monomer (EPDM), polyacrylic acid, sodium polyacrylate, polyacrylonitrile, glucose, gelatin, a saccharide, a phenolic resin, a naphthalene resin, a polyamide resin, a furan resin, a polyimide resin, a cellulose resin, a styrene resin, an epoxy resin, vinyl chloride resin, or a combination thereof.

7. A negative electrode comprising the negative active material for a rechargeable lithium battery as claimed in claim 1.

8. A rechargeable lithium battery, comprising
the negative electrode as claimed in claim 7;
a positive electrode; and
an electrolyte.

9. The negative active material for a rechargeable lithium battery as claimed in claim 1, wherein the chemical vapor deposition layer is deposited on the core particle, the chemical vapor deposition layer being coated to a thickness that is from about 0.1 μm to about 15 μm, and the chemical vapor deposition layer being coated to a thickness that is greater than an average particle diameter (D50) of the core particle.

* * * * *